(No Model.)
A. JAHANT & DE FOREST PARKER.
COFFEE POT HANDLE.
No. 336,323. Patented Feb. 16, 1886.
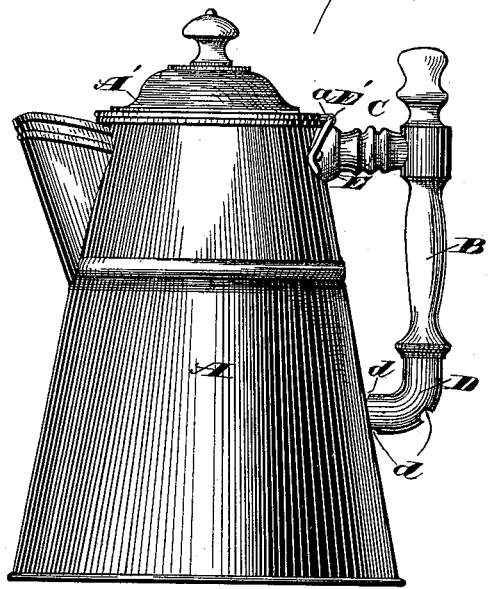
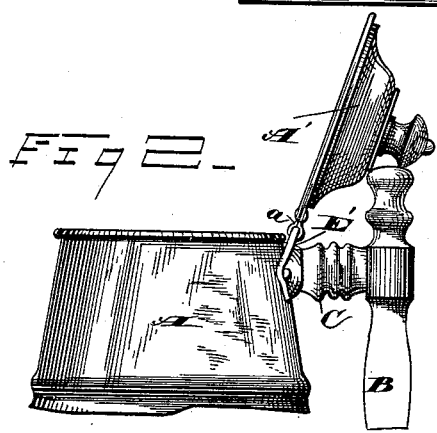
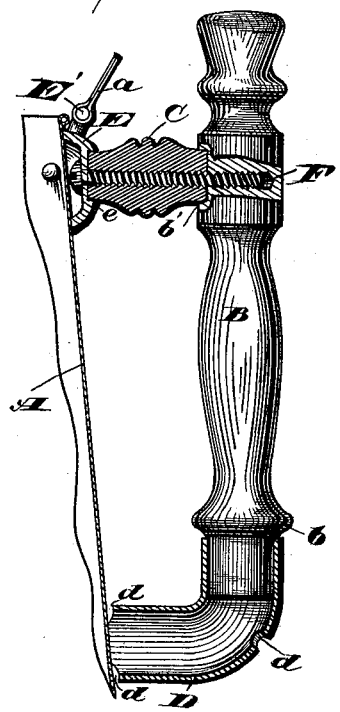
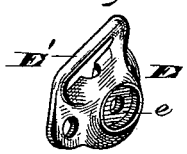
WITNESSES
INVENTORS
Augustus Jahant
De Forest Parker
by Leggett & Leggett
Attorneys

UNITED STATES PATENT OFFICE.

AUGUSTUS JAHANT AND DE FOREST PARKER, OF AKRON, OHIO.

COFFEE-POT HANDLE.

SPECIFICATION forming part of Letters Patent No 336,323, dated February 16, 1886.

Application filed May 7, 1885. Serial No. 164,723. (No model.)

*To all whom it may concern:*

Be it known that we, AUGUSTUS JAHANT and DE FOREST PARKER, of Akron, in the county of Summit and State of Ohio, have invented certain new and useful Improvements in Coffee-Pot Handles; and we do hereby declare the following to be a full, clear, and exact description of the invention, such as will enable others skilled in the art to which it pertains to make and use the same.

Our invention relates to improvements in wooden handles adapted more especially for tea-pots, coffee-pots, and similar vessels; and it is designed as an improvement on a device for which Letters Patent of the United States were granted to Augustus Jahant, being dated December 9, 1884, No. 309,060.

Our improvements pertain, first, to the metal piece that is soldered or riveted to the vessel and attached to the arm of the handle; and it consists in forming a loop on said metal piece for hinging the cover to the vessel, and in securing together the metal piece, arm, and handle by a wood-screw instead of a rivet, as formerly done.

A further improvement consists in substituting for the lower wooden arm formerly used a curved metal tube or arm, one end of which is secured to the vessel, and the other end projecting upward, forming a socket for receiving the lower end of the handle.

In the accompanying drawings, Figure 1 is a side elevation of a coffee-pot and handle embodying our invention. Fig. 2 is an elevation of the upper portion of the vessel, showing the cover opened. Fig. 3 is an elevation in section of the handle and connected parts. Fig. 4 is a view in perspective of the metal piece forming a part of the hinge for the cover and a support for the upper arm of the handle.

A represents the coffee-pot, A' the cover, B the wooden handle, C the wooden arm supporting the upper end of the handle, and D a curved metal tube or arm that is riveted or soldered or otherwise secured to the vessel, the upper end of the tube forming a socket for receiving the lower end of the handle. This tube may have holes $d$, for admitting air through the tube to keep it cool. A tube or hollow arm is preferable for this purpose on account of its being light and strong; but a solid arm curved in a similar form, and provided with a socket for receiving the handle, would answer the purpose. The handle at $b$ is enlarged, so that the hand does not come in contact with the part D. The advantage of this metal arm is, that it protects the handle from heat from below, whereas with the former device, patented as aforesaid, the lower end of the wooden handle and the under side of the lower arm were sometimes scorched when carelessly left over a very hot stove. The handle $b$ is made considerably larger than the end of the tube D, to protect the hand from contact with the latter. The metal plate E has a socket, $e$, that receives the end of the wooden arm C, the other end of the arm being inserted in a socket, $b'$, formed in the handle B. These parts were formerly secured by a rivet extending through the plate, arm, and handle. The objection to the rivet was, that it transmitted more or less heat to the handle, and the head of the rivet on the outside was a blemish.

In place of the rivet, we secure these parts by a wood-screw, F, the head being on the inside of the plate E, as shown in Fig. 3. The plate E may be stamped from sheet metal, or may be of cast metal, as preferred, and has a loop, E', for hinging the cover A'. A metal strip, $a$, is wrapped around the lateral crossbar forming the top of the loop, (see Fig. 3,) and the strip $a'$ is then secured to the cover. The metal forming the body of the vessel, at the upper end, is usually turned over a small wire, for stiffening and giving a better firmness to this part.

The hinge has heretofore usually been formed by cutting away the metal around a portion of this wire, and embracing the wire thus exposed with the metal strip that is secured to the cover. This wire is necessarily small and easily broken, and is liable to "rust out" in a short time.

The cross-bar of the loop E' in our improved device is of considerable size, and is therefore strong and durable, and is more conveniently made than the said bar heretofore used.

What we claim is—

1. The combination, with a pot, of a curved metal arm secured to the pot and having an upper open end, a handle secured within said open end, and a support for connecting the upper end of the handle to the pot, substantially as set forth.

2. The combination, with a pot, a handle-support, and the handle seated at its lower end in said support, of the socketed plate E, the arm C, and the screw passing through the socketed plate and arm and entering the handle, substantially as described.

In testimony whereof we sign this specification, in the presence of two witnesses, this 28th day of April, 1885.

AUGUSTUS JAHANT.
    DE FOREST PARKER.

Witnesses:
 T. H. HAWLEY,
 NEWTON CHALKER.